(12) United States Patent
Lal

(10) Patent No.: US 9,452,885 B1
(45) Date of Patent: Sep. 27, 2016

(54) HEIGHT-BASED ITEM RETRIEVAL

(71) Applicant: Amazon Technologies, Inc., Reno, NV (US)

(72) Inventor: Hemal Anilkumar Lal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 35 days.

(21) Appl. No.: 14/572,614

(22) Filed: Dec. 16, 2014

(51) Int. Cl.
  G06F 7/00 (2006.01)
  B65G 1/137 (2006.01)
  G06Q 10/08 (2012.01)
  B65G 1/10 (2006.01)
  B65G 1/06 (2006.01)
  G05B 15/02 (2006.01)

(52) U.S. Cl.
  CPC .............. *B65G 1/1373* (2013.01); *B65G 1/06* (2013.01); *B65G 1/10* (2013.01); *G05B 15/02* (2013.01); *G06Q 10/08* (2013.01)

(58) Field of Classification Search
  None
  See application file for complete search history.

(56) References Cited

U.S. PATENT DOCUMENTS

| 5,273,392 | A  | * | 12/1993 | Bernard, II | ......... | B65D 1/0485 198/341.04 |
| 2010/0169186 | A1 | * | 7/2010 | Sakaguchi | ............... | G07F 9/02 705/26.1 |
| 2012/0279285 | A1 | * | 11/2012 | Kato | ....................... | B21D 5/02 73/65.01 |
| 2014/0145762 | A1 | * | 5/2014 | Shrivastava | ........... | G01R 21/00 327/78 |

* cited by examiner

*Primary Examiner* — Yolanda Cumbess
(74) *Attorney, Agent, or Firm* — Thomas | Horstemeyer, LLP

(57) ABSTRACT

A height-aware item retrieval assignment system ("HIRS") may facilitate height-aware assignment of mobile shelving units ("MSUs") to operators during item retrieval. The HIRS may associate various operators with stations of varying heights on which the operators may stand or sit for item retrieval. Coverage may be based on effective item retrieval height zones, which may overlap such that possible shelving heights of MSUs may be reached by one or more of the operators at their associated stations. Upon receipt of an order of items to be retrieved from an MSU, the HIRS may assign the MSU based on the received height information. The HIRS may also adjust heights of the stations rather than relying on stations of fixed heights.

20 Claims, 8 Drawing Sheets

HEIGHT-BASED ITEM RETRIEVAL

BACKGROUND

After items are purchased and ordered through an electronic marketplace, the order may be sent to a fulfillment center, where the items of the order may be retrieved from storage and assembled together for shipment. In various scenarios, items may be ordered in virtually any combination, which means people must be tasked with retrieving the items so that they can be combined for shipment. Additionally, because a given fulfillment center may have thousands of items, items that are to be combined in an order may be stored at disparate locations throughout a fulfillment center.

In some scenarios, in order to efficiently allow people to retrieve items, systems may provide for mobile shelving units ("MSUs"), which may include mobile robots that may be utilized along with shelving units containing bins of items which may be ordered. In such scenarios, an MSU may, under computer control, be assigned to a person tasked with retrieving items for shipment (herein referred to as an "operator"). The MSU may travel to the operator, who may receive an indication of one or more items that are intended to be retrieved from the MSU. The operator may then retrieve the item(s) from the mobile shelving unit and set the item(s) aside for later shipment.

In order to most efficiently utilize the MSUs, in some scenarios each MSU may include shelves at different height levels, such that each unit has bins of items at different levels. While this may allow for greater utilization of each MSU, in many scenarios, an operator may find that they cannot always comfortably reach the bin from which they are to retrieve items, either because the items are too high or too low. In such situations, sometimes the operators must resort to using ladders to reach the needed items. Such special circumstances can result in an inefficient usage of time and slower overall fulfillment, which is undesirable.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Techniques described provide for height-based item retrieval, such as in an item fulfillment setting. A height-aware item retrieval assignment system ("HIRS") may facilitate height-aware assignment of mobile shelving units ("MSUs") to operators during item retrieval. The HIRS may receive information relating to heights of one or more operators that are to retrieve items from MSUs. The HIRS may associate the various operators with stations of varying heights on which the operators may stand or sit for item retrieval. The operators may be associated with the stations in order to provide efficient coverage of a range of shelving heights of the MSUs. The coverage may be based on effective item retrieval height zones for each operator and their associated station. The effective item retrieval height zones may overlap such that multiple shelving heights of the MSUs may be reached by one or more of the operators while standing or sitting on their associated stations. Height information for the operators may be adjusted by the HIRS over time, such as in response to particular operators' item retrieval efficiency.

Upon receipt of an order of items to be retrieved from an MSU, the HIRS may assign the MSU based on the received height information. For example, if items to be retrieved are found on a mobile shelving unit at shelving heights of 4 feet and 5 feet, the HIRS may assign the mobile shelving unit to an operator whose effective item retrieval height zone (while standing on their station) is 4-6 feet. The HIRS may also adjust heights of the stations rather than relying on stations of fixed heights.

Various embodiments of the HIRS, as well as techniques associated with the HIRS, are described herein with reference to item retrieval. However, it may be recognized that, in various embodiments, other activities may be performed where operators may access or otherwise interact with items that are stored on MSUs as well as in other inventory storage systems. For example, techniques described herein may be utilized with one or more of: item retrieval, item storage or stowage, inventory counting, inventory rearrangement quality review, etc. Thus, references to "item retrieval," including "personal item retrieval height zones" or "effective item retrieval height zones," as used herein are made for the purposes of clear description and should not be read as necessarily limiting embodiments to exclude these other item access activities or operations.

Figure 1:
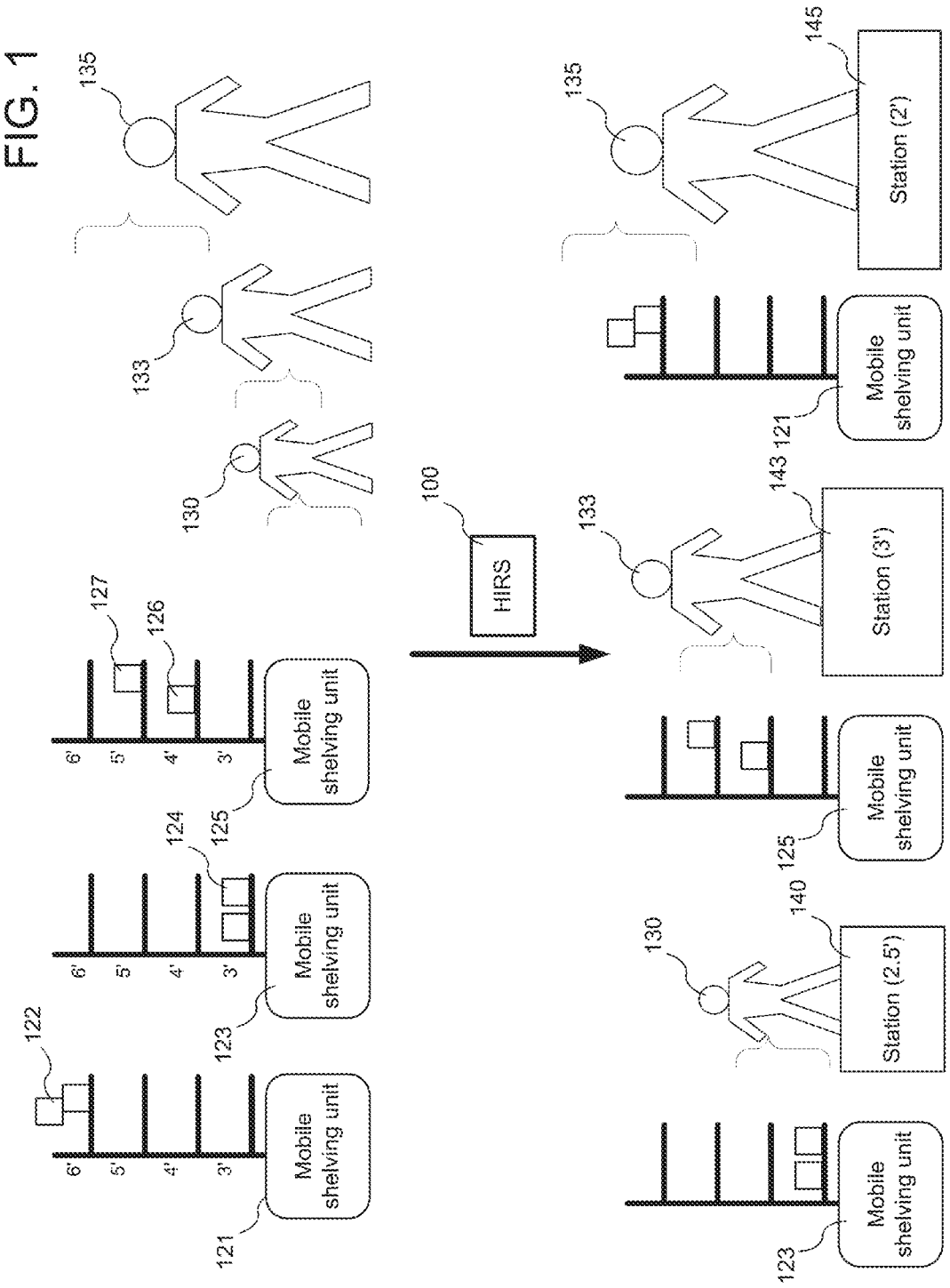
FIG. 1 is a diagram illustrating an example of height-aware assignment for item retrieval in accordance with various embodiments.

Referring now to FIG. 1, a diagram illustrating an example height-aware assignment for item retrieval is illustrated in accordance with various embodiments. In the example of FIG. 1, three MSUs 121, 123, and 125 are illustrated, each with example items for retrieval. It may be recognized that, in the illustration of FIG. 1, only the relevant items to be retrieved are shown; however, in various embodiments, MSUs may have a plurality of items, some of which may or may not be ordered for retrieval. Returning to the example of FIG. 1, MSUs 121 and 123 respectively contain items for retrieval 122 and 124, and MSU 125 contains items for retrieval 126 and 127. As illustrated on MSU 121, items 122 on MSU 121 are on the 6-foot shelf, items 124 on MSU 123 are on the 3-foot shelf, and items 126 and 127 are located on the 4-foot and 5-foot shelves of MSU 125.

Additionally, in the example of FIG. 1, there are three operators 130, 133, and 135 who are persons tasked with retrieving items from the MSUs. As illustrated, each of the operators 130, 133, and 135 is of a different height (note that height differences are somewhat exaggerated for the sake of illustration). Additionally, as illustrated in FIG. 1, each of the three operators 130, 133, and 135 has a personal height zone at which they are comfortable and/or efficient at retrieving items. For example, in FIG. 1, operator 130 has a personal item retrieval height zone of roughly 0-2.5 feet, operator 133 has a personal item retrieval height zone of roughly 1-4 feet, and operator 135 has a personal item retrieval height zone of roughly 4-6 feet. In various embodiments, this personal item retrieval height zone may vary based on physical characteristics and/or physical capabilities of the operators. For example, in various embodiments, these personal item retrieval height zones may vary based on operator height, operator ability or disability, operator movement patterns, operator strength, personal preference, etc. In other embodiments, other characteristics or capabilities may affect the personal item retrieval height zone of an operator. It may be noted that, by assigning MSUs to operators based on the effective item retrieval height zones, the HIRS may better facilitate more efficient and/or more ergonomic retrieval of items from MSUs. This may lead to faster item retrieval as well as less physical and mental stress on the operators.

FIG. 1 illustrates that, in the example, a height-aware item retrieval assignment system 100 ("HIRS 100") may receive information about the MSUs 121-125 (and the items contained thereon) and the operators 130-135 and may facilitate item retrieval based on height information for these MSUs and operators. Thus, in various embodiments, the operators may be associated by the HIRS 100 with stations of various heights on which they can stand (or sit) during item retrieval. In the example, operator 130 has been associated with a station 140 that is 2.5 feet tall, operator 133 has been associated with a station 143 that is 3 feet tall, and operator 135 has been associated with a station 145 that is 2 feet tall. As illustrated, after standing on their associated stations, the personal item retrieval height zones may be adjusted due to the relative heights of the associated stations, thus creating effective item retrieval height zones for each operator and station. In various embodiments, the HIRS 100 may be configured to associate the operators and stations such that the effective item retrieval height zones effectively cover an entire range of possible shelves on which items may be located, and/or effectively cover a range of possible shelves from which orders of items may be received, expected or predicted. Thus, in the example of FIG. 1, after standing on their associated stations, the effective item retrieval height zones for the three operators 130-135 cover the entire range of shelves from 3-6 feet. It may be noted that, as in the example of FIG. 1, operators may not be associated with stations based entirely on height. Thus, in the example of FIG. 1, while the tallest operator 135 is associated with the shortest station 145, the shortest operator 130 is on the intermediate-height station 140.

In addition to associating operators with stations, in various embodiments, the HIRS 100 may be configured to assign MSUs to the operators based on height information. In various embodiments, the assignment may be performed by the HIRS 100 based on effective item retrieval height zones. Thus, MSU 123 has been assigned to operator 130, because operator 130's effective item retrieval height zone (when standing on station 140) covers the 3-foot shelf on which needed items are found on MSU 123. Similarly, MSU 125 has been assigned to operator 133 and MSU 121 has been assigned to operator 135 because their respective effective item retrieval height zones coincide with the height locations of the items of MSU 125 and MSU 121.

Figure 2:
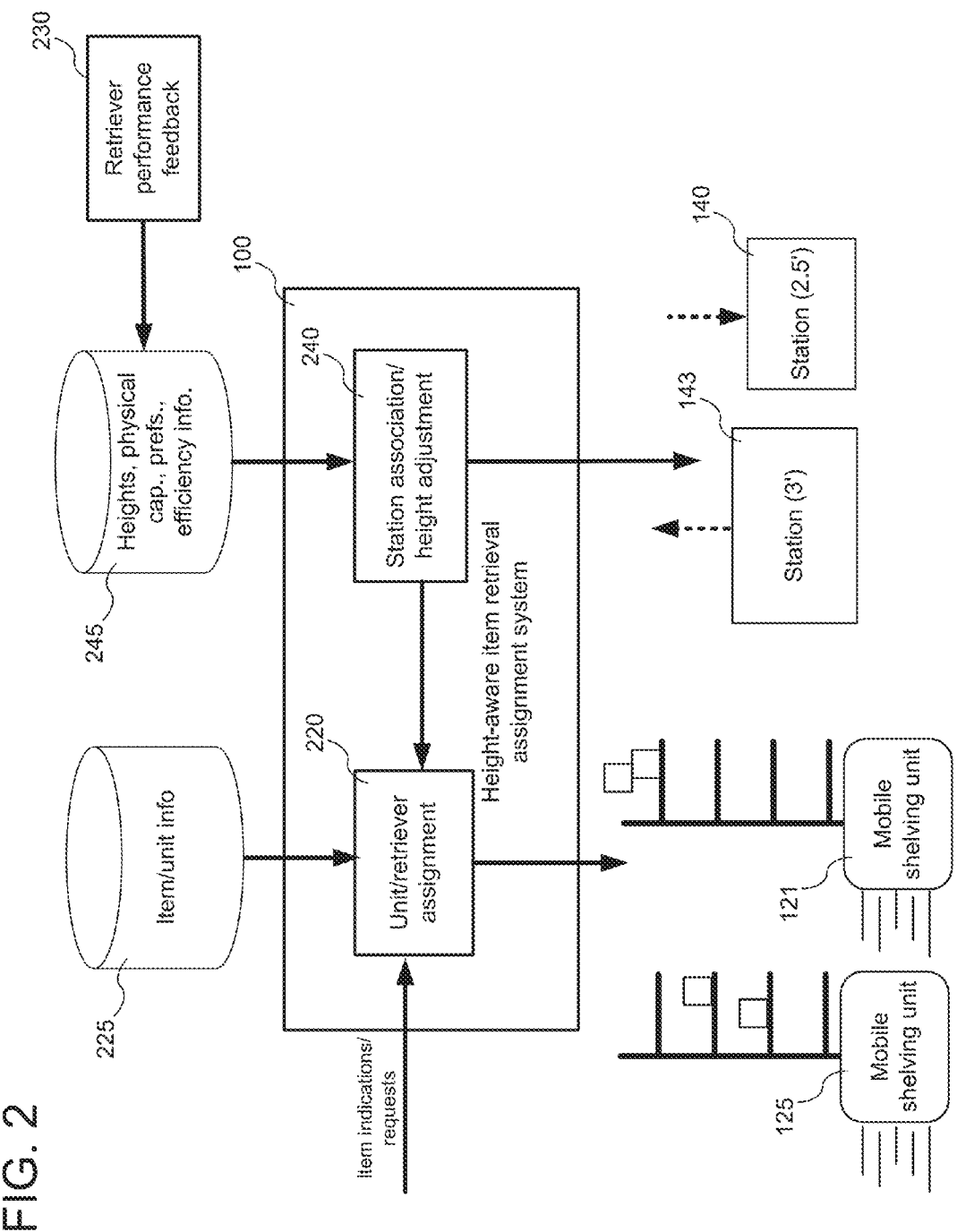
FIG. 2 is a block diagram illustrating example logical components and interaction points of a height-aware item retrieval assignment system, in accordance with various embodiments.

Referring now to FIG. 2, a block diagram of example logical components and interaction points of the HIRS 100 is shown, in accordance with various embodiments. In various embodiments, the HIRS 100 may include a station association/height adjustment module 240 ("SAH 240"), which may be implemented in various embodiments in software and/or hardware. The SAH 240 may be configured to associate operators with stations of various heights, such as to achieve coverage of a range of shelf heights for MSUs. In various embodiments, the SAH 240 may receive information from a height/physical information storage 245 ("HIS 245"). In various embodiments, information stored by the HIS 245 may include, but is not limited to, information such as: operator heights, operator physical capabilities, operator disabilities or physical difficulties, operator preferences, operator strength, etc. In various embodiments, an operator performance feedback module 230 ("RFM 230"), which may operate externally of the HIRS 100, may provide additional information to the HIS 245 based on operator performance. For example, if an operator is associated with a particular station at a particular height and performs abnormally well or abnormally poorly, the RFM 230 may provide this information to the HIS 245 to facilitate better associations by the SAH 240 in the future. In another example, if, when using a particular station with adjustable height, an operator consistently adjusts the height of their station, the RFM 230 may provide this information to the HIS 245 so that the SAH 240 may re-associate the operator with a station that is at a height closer to the operator's preferred height.

In some embodiments, the SAH 240 may also be configured to cause stations (e.g. those stations that can adjust their heights) to adjust height in order to change effective item retrieval height zones for one or more operators. For example, the SAH 240 illustrates communication with stations 143 and 140 to cause station 143 to increase its height and to cause station 140 to decrease its height. In some embodiments, the SAH 240 may be configured to cause stations to adjust heights if there are too few operators currently working to adequately cover a range of shelf heights for the MSUs. In other embodiments, the SAH 240 may be configured to communicate with one or more MSUs to cause the MSUs to adjust their heights rather than adjusting the heights of stations. It may be recognized that various techniques and apparatuses for adjusting heights may be used in the MSUs and/or stations. For example, in various embodiments, the heights of the MSUs and/or stations may be adjusted via mechanical, electromechanical, hydraulic, and/or pneumatic means incorporated into the MSUs and/or stations. Additionally, in various embodiments other techniques for adjusting the heights of the MSUs and/or stations may include the use of cranes, lifts, and/or platforms which may physically move the MSUs and/or stations, as well as ramps or other surfaces of varying heights, on which the MSUs and/or stations may move; these techniques may be understood by those of ordinary skill.

In addition to the SAH 240, the HIRS 100 may also include a unit/operator assignment module 220 ("UAM 220"), which may be implemented in hardware and/or software. In various embodiments, the UAM 220 may be configured to receive indications of or requests for items to be retrieved, such as from an item ordering system (not illustrated) and to assign MSUs to particular operators based on height information as described herein. In various embodiments, the UAM 220 may be configured to perform assignment using information received from an item/MSU information storage 225 ("IIS 225"). In various embodiments, the IIS 225 may be configured to store item locations, including on which MSUs the items are located, as well as on which shelves of the MSUs the items are located. Additionally, the UAM 220 may be configured to receive station/operator associations from the SAH 240. The UAM 220 may also be configured to receive information about effective item retrieval height zones from the SAH 240. The UAM 220 may then be configured to cause MSUs, such as the illustrated MSUs 121 and 125 to move to their assigned stations/operators for item retrieval.

Figure 3:
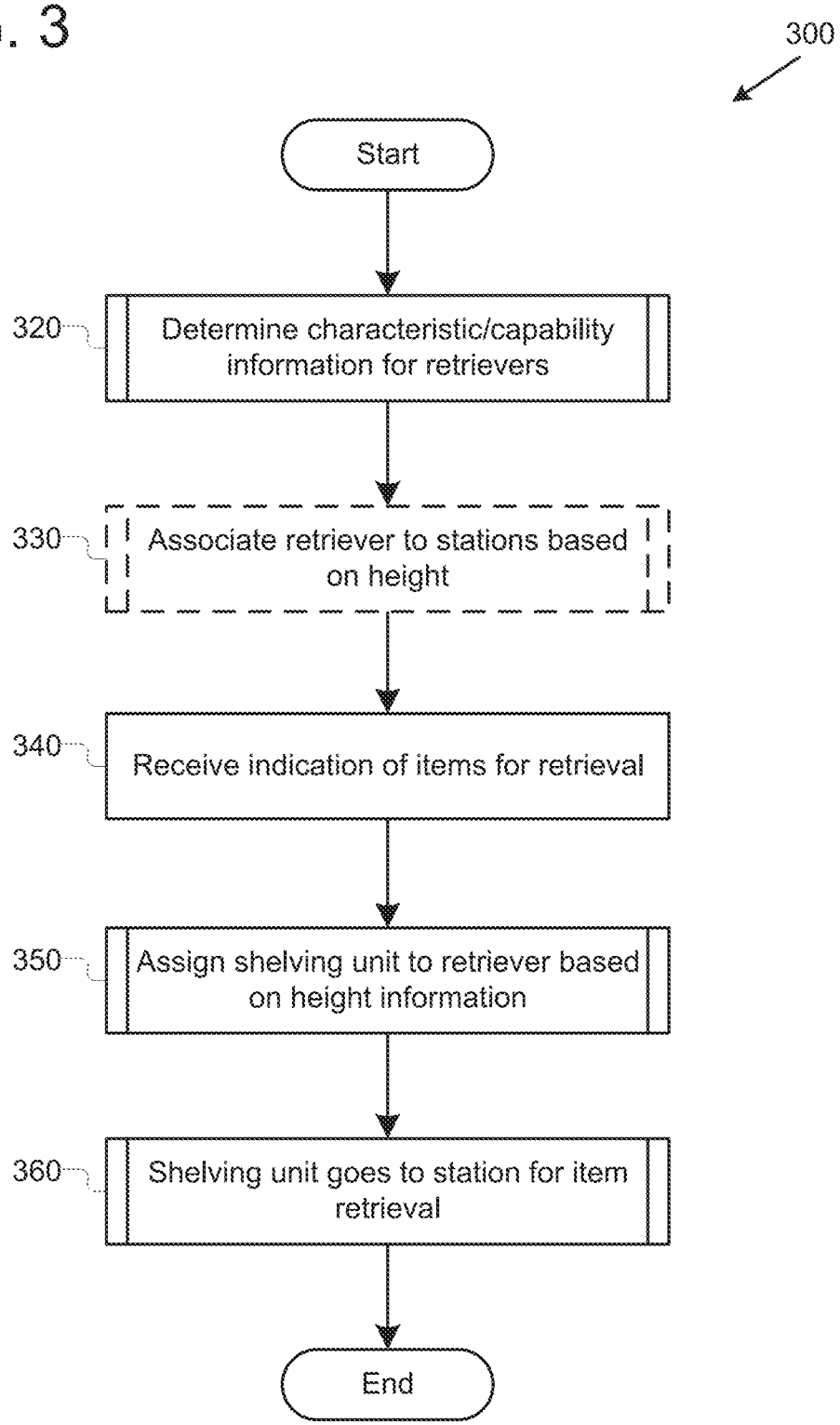
FIG. 3 is a flowchart illustrating an example process for performing height-aware item-retrieval, in accordance with various embodiments.

FIG. 3 is a flowchart illustrating an example process 300 for performing height-aware item-retrieval in accordance with various embodiments. While particular examples and orders of operations are illustrated in FIG. 3, in various embodiments, these operations may be re-ordered, broken into additional operations, combined, and/or omitted altogether. The process may begin at operation 320, where the HIRS 100 may determine physical characteristics and physical capabilities information (such as that described above) for operators. Particular implementations of operation 320 are described below with reference to process 400 of FIG. 4. Next, at optional operation 330, the HIRS 100, and specifically the SAH 240, may associate operators to stations based on the determined physical characteristics and physical capabilities information. Particular implementations of operation 330 are described below with reference to process 500 of FIG. 5. It may be noted that, in some embodiments, operation 330 may not be performed; in such embodiments, the obtained physical characteristics and physical capabilities information may instead later be used by the UAM 220 to adjust heights of stations and/or MSUs.

Next, at operation 340, the HIRS 100, and more specifically the UAM 220, may receive indications of items to be retrieved, such as from an external ordering system. In various embodiments, these indications may be for items on a single MSU, or may be indications of items that are distributed across multiple MSUs. Next, at operation 350, the UAM 220 of the HIRS 100 may assign an MSU to an operator based on height information. Particular implementations of operation 350 are described below with reference to process 600 of FIG. 6. At operation 360, the UAM 220 of the HIRS 100 may cause the MSU to travel to the assigned operator/station for item retrieval. Particular implementations of operation 360 are described below with reference to process 700 of FIG. 7. The process may then end.

Figure 4:
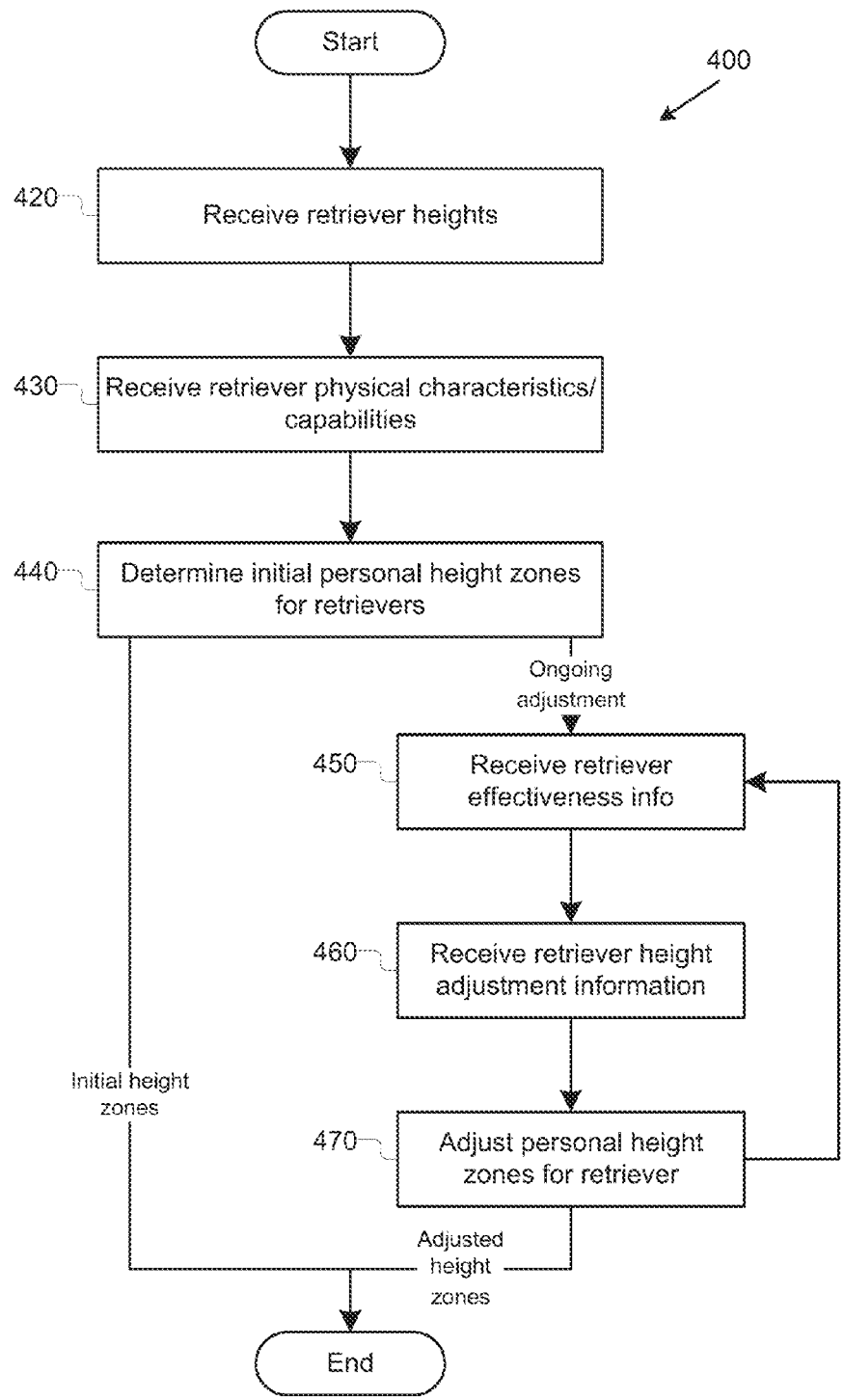
FIG. 4 is a flowchart illustrating an example process for determining information for operators, in accordance with various embodiments.

FIG. 4 is a flowchart illustrating an example process 400 for determining information for operators, in accordance with various embodiments. In various embodiments, process 400 may implement 320 of process 300 of FIG. 3. While particular examples and orders of operations are illustrated in FIG. 4, in various embodiments, these operations may be re-ordered, broken into additional operations, combined, and/or omitted altogether. The process may begin at operation 420, where the SAH 240 may receive operator heights. In various embodiments, these heights may be self-reported by operators or may be obtained from records, such as personnel records. Next, at operation 430, the SAH 240 may retrieve other physical characteristics and physical capabilities for the operators, such as those discussed above. At operation 440, the SAH 240 may determine personal item retrieval height zones for each of the operators. In various embodiments, the SAH 240 may perform this determination by using the received height information to determine default personal height zones for each operator. The SAH 240 may then modify these default personal item retrieval height zones based on the physical characteristics and physical capabilities. For example, if an operator has difficulty reaching above their head, the SAH 240 may lower their personal item retrieval height zone. In another example, if an operator is particularly strong, the SAH 240 may expand their personal item retrieval height zone to include heights at which heavier items tend to be stored on MSUs.

In some embodiments, the personal item retrieval height zones determined at operation 440 may be used as an initial set of personal item retrieval height zones and the process may then end. However, in various embodiments, the SAH 240 may be configured to perform ongoing adjustment and re-determination of personal item retrieval height zones. In such scenarios, at operation 450, the SAH 240 may receive information about operator effectiveness during item retrieval. Next, at operation 460, the SAH 240 may receive information about adjustments an operator may have made during item retrieval, such as by adjusting the height of a station to better reach particular items/shelves. For example, the SAH 240 may receive information that an operator is less effective at a particular shelf height or always adjusts a station to reach a particular shelf; this information may allow the SAH 240 to remove that particular height from the personal item retrieval height zone for the operator. This information may be received from the HIS 245, which may in turn obtain the information from the RFM 230. At operation 470, the SAH 240 may thus adjust the personal item retrieval height zone for that operator. In various embodiments, the process may then end with these adjusted personal item retrieval height zones. In other embodiments, the SAH 240 may continuously adjust personal item retrieval height zones by returning to operation 450. Such continuous adjustment may occur even when other operations described herein, such as operator/station association and MSU/operator assignment, are occurring.

Figure 5:
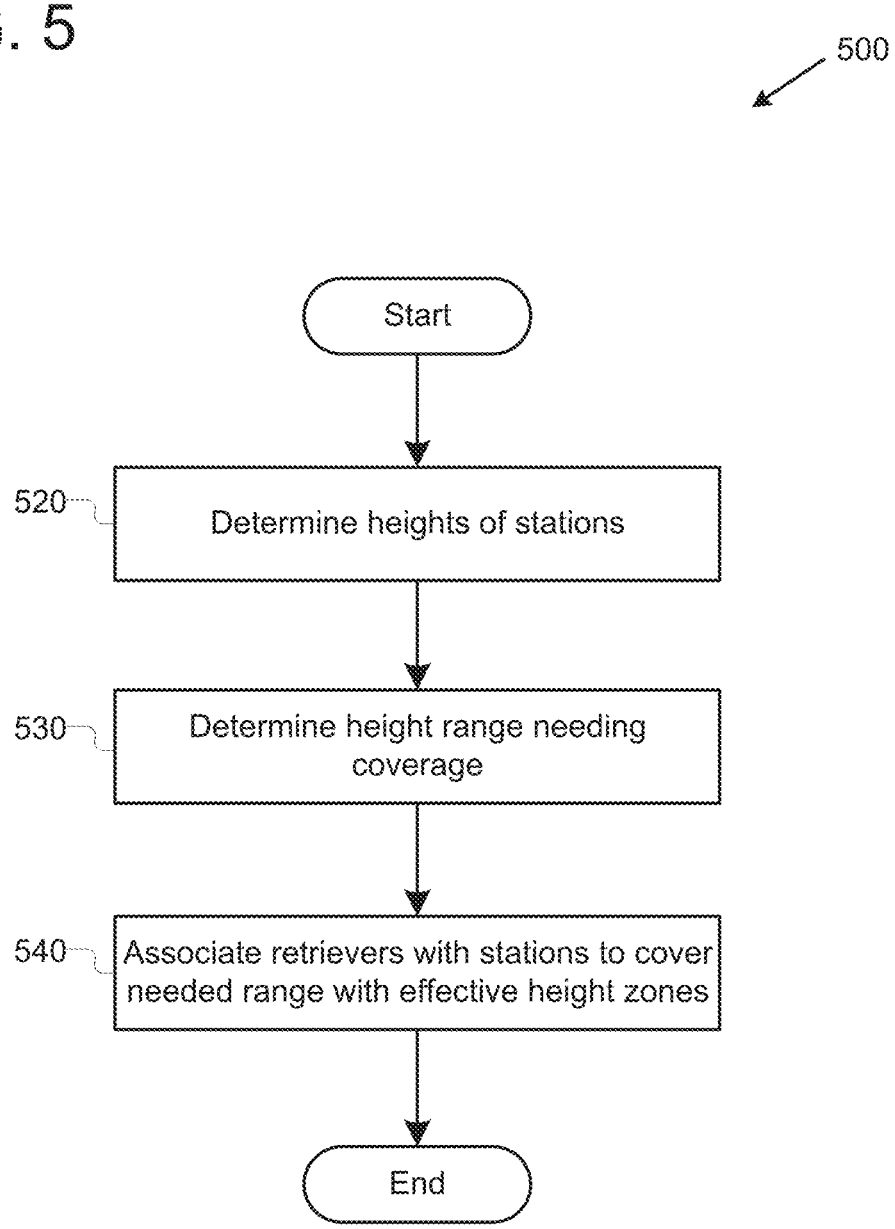
FIG. 5 is a flowchart illustrating an example process for associating operators with stations, in accordance with various embodiments.

FIG. 5 is a flowchart illustrating an example process 500 for associating operators with stations, in accordance with various embodiments. In various embodiments, process 500 may implement 330 of process 300 of FIG. 3. While particular examples and orders of operations are illustrated in FIG. 5, in various embodiments, these operations may be re-ordered, broken into additional operations, combined, and/or omitted altogether. The process may begin at operation 520, where the SAH 240 may determine heights of stations that are available to be used by operators. In various embodiments, the HIRS 100 may be utilized with a variety of stations of various heights to provide for additional freedom in associating operators with stations. In other embodiments, stations of only a few heights (or even of only one height) may be utilized. Next, at operation 530, the SAH 240 may determine a height range for which coverage is needed. In various embodiments, the needed height coverage may include an entire set of shelves of a set of MSUs; in other embodiments, only a subset of heights may be needed, such as if only a particular subset of MSUs or subset of items is to be retrieved. Finally, at operation 540, the SAH 240 may associate operators with stations to cover the needed height range with effective item retrieval height zones. Thus, at operation 540, the SAH 240 may determine which combination of operators and stations will produce effective item retrieval height zones (e.g. the covered height zone by an operator on a station) that will cover the needed height range. Various embodiments may utilize different techniques for associating operators and stations to cover the height zones as will be understood by those of ordinary skill. The process may then end.

Figure 6:
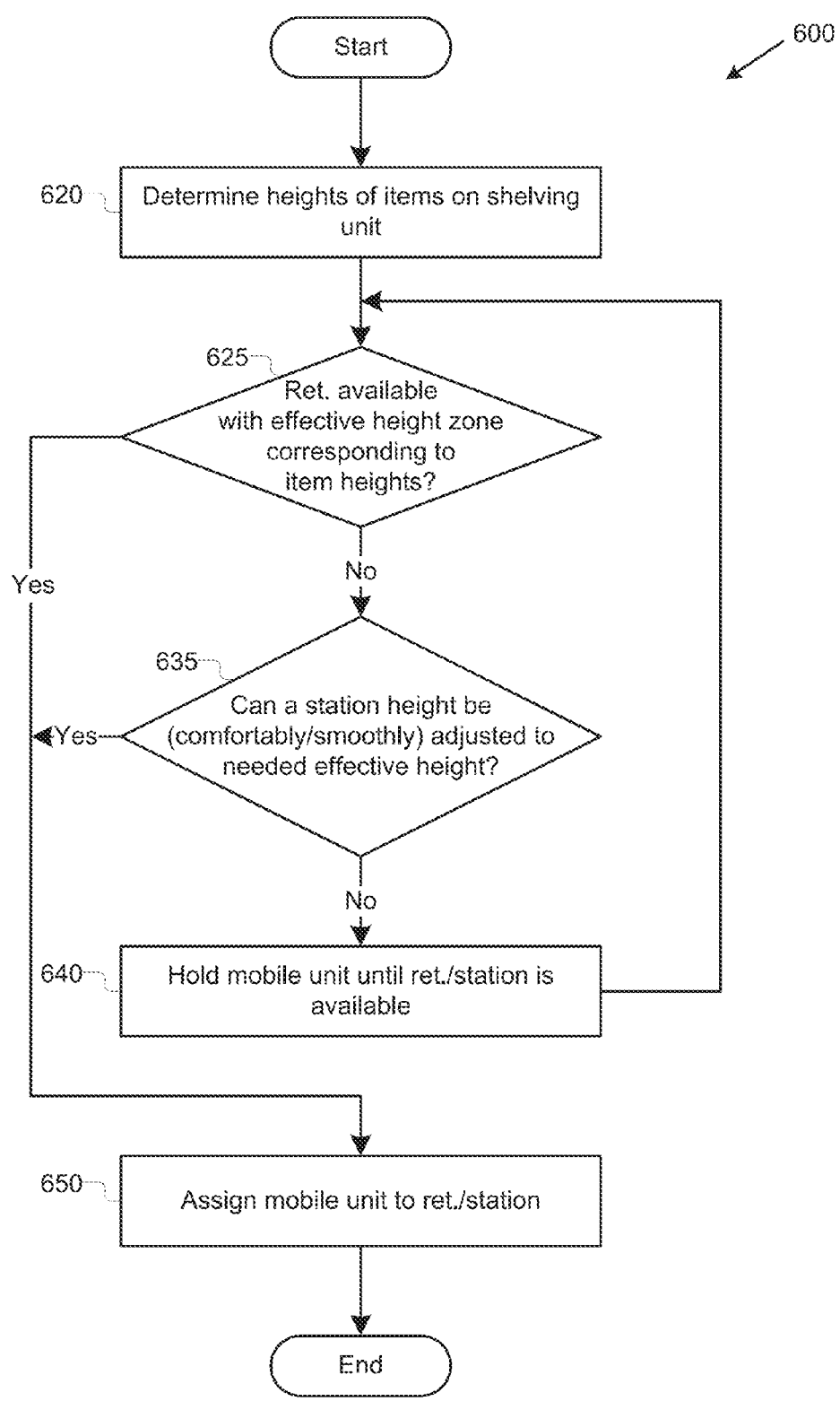
FIG. 6 is a flowchart illustrating an example process for assigning MSUs to operators based on height information, in accordance with various embodiments.

FIG. 6 is a flowchart illustrating an example process 600 for assigning MSUs to operators based on height information, in accordance with various embodiments. In various embodiments, process 600 may implement 350 of process 300 of FIG. 3. While particular examples and orders of operations are illustrated in FIG. 6, in various embodiments, these operations may be re-ordered, broken into additional operations, combined, and/or omitted altogether. The process may begin at operation 620, where the UAM 220 may determine heights (on the MSUs) of the items to be retrieved. In various embodiments, this information may be retrieved from the IIS 225. Next at decision operation 625, the UAM 220 may determine whether there is an operator available whose effective item retrieval height zone corresponds to the heights of the items to be retrieved. In various embodiments, as part of determining whether an operator is available, the UAM 220 may determine whether the MSU may be placed in a queue for a particular operator, such as if the operator is currently retrieving items from a different MSU. If an operator is available, then at operation 650 the UAM 220 may assign the MSU to that operator and their associated station. The process may then end.

If, at decision operation 625, the UAM 220 determines that there is no operator available whose effective item retrieval height zone covers the heights of the items to be retrieved, then at decision operation 635, the UAM 220 may determine whether a station can be adjusted in order to change the effective item retrieval height zone to the needed coverage. As with decision operation 625, in various embodiments, as part of determining whether an operator is available at decision operation 635, the UAM 220 may determine whether the MSU may be placed in a queue for a particular operator. In other embodiments, at decision operation 635, the UAM 220 may determine whether the station may be comfortably or smoothly moved to the desired height. For example, a comfortable or smooth adjustment of the station height may correspond to one or more of: incremental changes of the station height in the same direction, a change in direction of station height adjustment only after lapse of a predetermined period of time, a maximum amount of change of station height per adjustment, and/or a maximum number of changes of station height over a predetermined period of time. Thus, if a station was just moved up a few feet, and the current items would require moving the station immediately back down, the UAM 220 may determine that the associated operator is not available to be moved so as not to cause too much unpleasant, rapid or repeated movement of the operator. If, however, an operator is available, then the process may proceed to operation 650 and the operator may be assigned. The process may the end. If not, then at operation 640, the UAM 220 may cause the MSU to be held until an operator and their associated station is available, and then may return to decision operation 625.

Figure 7:
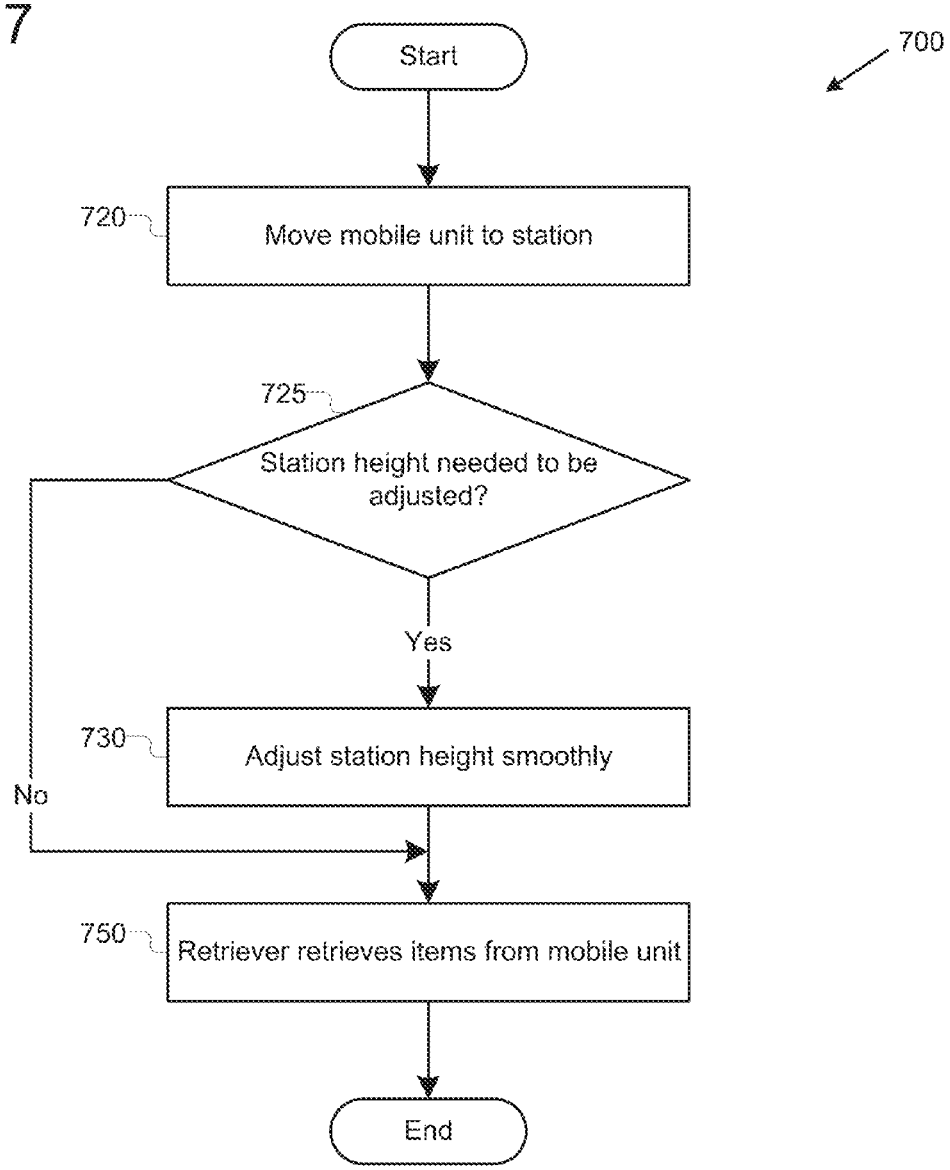
FIG. 7 is a flowchart illustrating an example process for an MSU going to a station for item retrieval, in accordance with various embodiments.

FIG. 7 is a flowchart illustrating an example process 700 for an MSU going to a station for item retrieval, in accordance with various embodiments. In various embodiments, process 700 may implement 360 of process 300 of FIG. 3. While particular examples and orders of operations are illustrated in FIG. 7, in various embodiments, these operations may be re-ordered, broken into additional operations, combined, and/or omitted altogether. The process may begin at operation 720, where the UAM 220 may cause the MSU to be moved to the assigned station. Next, at decision operation 725, the UAM 220 may determine whether the station height needs to be adjusted. If so, then at operation 730, the UAM 220 may cause the station to comfortably and smoothly adjust the height of the station to the desired height. For example, a comfortable and smooth adjustment of the station height may correspond to one or more of: incremental changes of the station height in the same direction, a change in direction of station height adjustment only after lapse of a predetermined period of time, a maximum amount of change of station height per adjustment, and/or a maximum number of changes of station height over a predetermined period of time. In either case, at operation 750, the operator, whose effective item retrieval height zone should now cover the height at which items are to be retrieved, may then retrieve items from the MSU. The process may then end.

Figure 8:
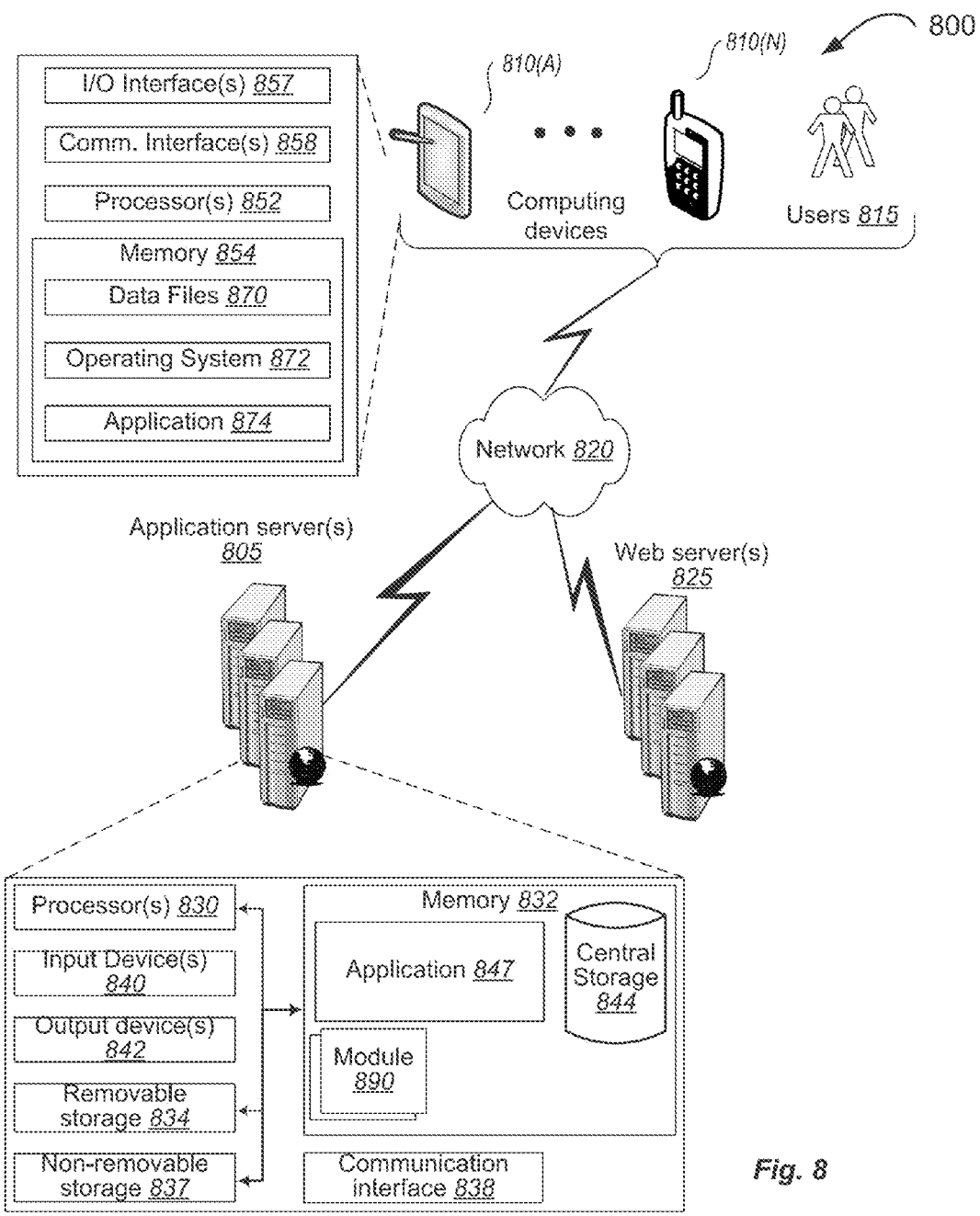
FIG. 8 illustrates an example computing environment in which embodiments described in the present disclosure may be implemented in accordance with various embodiments.

FIG. 8 illustrates an example of an illustrative computing environment 800 for implementing aspects in accordance with various embodiments described herein. The illustrative computing environment 800 may include one or more electronic computing devices 810(A)-810(N), which may include any appropriate device operable to send and receive requests, messages, or information over an appropriate network 820. Examples of such computing devices may include personal computers, smartphones, cell phones, handheld messaging devices, laptop computers, set-top boxes, personal data assistants, electronic book readers, tablet computers and the like.

The computing devices 810(A)-810(N) may include a processor 852 and memory 854 for storing processor-executable instructions, such as data files 870, operating system 872 and one or more applications 874. The operating system 872 may be a general purpose operating system such as a Microsoft Windows® operating system, a UNIX® operating system, a Linux® operating system or an operating system specifically written for and tailored to the computing devices 810(A)-810(N).

The computing devices 810(A)-810(N) may further include at least one or both of the following elements: input/output interface 857 and communication interface 858. The communication interface 858 may enable the computing devices 810(A)-810(N) to communicate data, control signals, data requests and other information with other resources including computers, data sources, storage devices and the like, over the appropriate computer network 820 such as the Internet, via wired or wireless connections. The input/output interface 857 may enable the computing devices 810(A)-810(N) to obtain data input from a variety of devices including, but not limited to, a digital pen, a touch screen, a keyboard, a mouse, a scanner and the like. In addition to the illustrative components described above, a display interface (not shown) may be used for outputting display information to a computer user 815. Typically, the display information may be outputted by the display interface via a display device (e.g., a CRT monitor, an LCD screen, a touch screen, a television, an integrated screen or sets of screens, etc.).

The network 820 may include any appropriate network, including an intranet, the Internet, a cellular network, a local area network, a personal network or any other such network or combination thereof. Components used for such a system can depend at least in part upon the type of network and/or environment selected. Protocols and components for communicating via such a network are well known and will not be discussed herein in detail. Communication over the network may be enabled by wired or wireless connections, and combinations thereof.

The memory 854 may generally comprise RAM, ROM and/or other permanent memory. Thus, in addition to storage in read/write memory (RAM), programming instructions may also be embodied in read-only format, such as those found in ROM or other permanent memory.

The illustrative computing environment 800 may include at least one application server 805 including, or associated with, one or more processors 830, input devices 840, output devices 842, removable storage 834 and non-removable storage 837 that may be connected to a communication interface 838 and memory 832. The memory 832 may include, but is not limited to, one or more applications 847.

The memory 832 may further include a centralized storage 844. As used herein, the centralized storage 844 may include any device or combination of devices capable of storing, accessing and retrieving data, which may include any combination and number of data servers, databases, data storage devices and data storage media, in any standard, distributed or clustered environment. It should be understood that there may be many other aspects that may need to be stored in the memory 832, such as user access right information, which may be stored in any of the above-listed mechanisms as appropriate.

The memory 832 may further include, or be coupled with, one or more modules 890 which may correspond, for example, to the UAM 220, RFM 230, or SAH 240, as described above.

The application server 805 may include any appropriate hardware and software for integrating with the centralized storage 844 as needed to execute aspects of one or more applications for the computing devices 810(A)-810(N), handling a majority of the data access and business logic for an application. The application server 805 may provide access control services in cooperation with the centralized storage 844, and is able to generate content such as text, graphics, audio and/or video to be transferred to a viewer, which may be served to the viewer by a Web server 825 in the form of HTML, XML or another appropriate structured language in this example. The handling of all requests and responses, (e.g., requests for item information and the information provided in response) as well as the delivery of content between the computing devices 810(A)-810(N) and the application server 805 may be handled by the Web server 825.

It should be understood that the Web and application servers 805 and 825 are not required and are merely example components, as the applications and software components discussed herein may be executed on any appropriate device or host machine, such as described elsewhere herein. Each server 805 or 825 may include an operating system that may provide executable program instructions for the general administration and operation of that server, and may include a computer-readable medium storing instructions that, when executed by a processor (e.g., 830) of the server, may allow the server to perform its intended functions. Suitable implementations for the operating system and general functionality of the servers are known or commercially available, and are readily implemented by persons having ordinary skill in the art, particularly in light of the disclosure herein.

The illustrative computing environment 800 may include a distributed computing environment utilizing several computer systems and components that may be interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the illustrative computing environment 800 in FIG. 8 should be taken as being illustrative in nature, and not limited to the scope of the disclosure. In embodiments one or more of the computing devices 810A or 810N may include or be directly coupled with a memory such as memory 832 that may include one or more modules 890 and/or the centralized storage 844.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. A computer-implemented method for facilitating retrieval of items by operators from a mobile shelving unit comprising multiple shelves at different heights, the method comprising:
    associating, by a computing system, one or more operators to one or more stations, wherein the stations have different heights;
    determining, by the computing system, for each of the operators, an effective item retrieval height zone for the operator standing on an associated station;
    determining, by the computing system, for one or more items that are to be retrieved from a mobile shelving unit, a height level of shelves of the mobile shelving unit at which the one or more items are located;
    determining, by the computing system, an operator of the one or more operators whose effective item retrieval height zone coincides with the height level of the determined shelves for the one or more items; and
    assigning, by the computing system, the determined operator to retrieve the one or more items from the mobile shelving unit.

2. The computer-implemented method of claim 1, wherein:
    the mobile shelving unit is one of a plurality of mobile shelving units each comprising a range of shelving heights; and
    associating one or more operators to one or more stations comprises associating the one or more operators to the one or more stations such that the effective item retrieval height zones for the one or more operators cover the range of shelving heights.

3. The computer-implemented method of claim 1, wherein determining one or more effective item retrieval height zones comprises determining heights of the one or more operators.

4. The computer-implemented method of claim 1, further comprising changing, by the computing system, a height of the station to which the assigned operator is associated such that the effective item retrieval height zone for the assigned operator coincides with a height level of shelves on another mobile shelving unit from which one or more additional items are to be retrieved.

5. The computer-implemented method of claim 1, wherein determining an operator of the one or more operators comprises determining an operator who has availability to retrieve the one or more items.

6. A computer-implemented method comprising:
- determining, by a computing system, for an operation involving a mobile shelving unit having a plurality of shelves at different heights, a height level for the operation;
- determining, by the computing system, one or more effective operational height zones for one or more operators associated with one or more stations of different heights, the one or more operators being assignable to perform the operation involving the mobile shelving unit; and
- assigning, by the computing system, an operator of the one or more operators to perform the operation involving the mobile shelving unit based at least on the determined height level for the operation involving the mobile shelving unit and the determined one or more effective operational height zones for the one or more operators.

7. The computer-implemented method of claim 6, wherein the height level for the operation involving the mobile shelving unit comprises a height of one of the plurality of shelves.

8. The computer-implemented method of claim 6, wherein determining one or more effective operational height zones comprises determining one or more physical characteristics or physical capabilities of the one or more operators.

9. The computer-implemented method of claim 6, wherein determining one or more effective operational height zones comprises determining one or more station heights for the one or more stations at which the one or more operators are standing or sitting.

10. The computer-implemented method of claim 9, further comprising associating the one or more operators to the one or more stations based on at least one of one or more physical characteristics or physical capabilities of the one or more operators, or the one or more station heights.

11. The computer-implemented method of claim 10, wherein associating the one or more operators to the one or more stations comprises associating the one or more operators such that the effective operational height zones for the one or more operators at the one or more stations cover multiple height levels for a plurality of operations involving a plurality of mobile shelving units.

12. The computer-implemented method of claim 6, wherein:
- the one or more operators are standing or sitting at the one or more stations; and
- the method further comprises changing or causing to change, by the computing system, a height of a respective station to which the assigned operator is associated such that the effective operational height zone for the assigned operator is coincident with the height level for the operation involving the mobile shelving unit.

13. The computer-implemented method of claim 6, further comprising changing or causing to change, by the computing system, a height of the mobile shelving unit to which the assigned operator is assigned such that the effective operational height zone for the assigned operator is coincident with the height level for the operation involving the mobile shelving unit following the change in height of the mobile shelving unit.

14. The computer-implemented method of claim 6, further comprising assigning one or more other mobile shelving units to the assigned operator based at least on determined height levels for one or more operations involving the one or more other mobile shelving units and the determined effective operational height zone for the assigned operator.

15. The computer-implemented method of claim 6, wherein assigning an operator of the one or more operators comprises assigning an operator who has availability to perform the operation.

16. One or more non-transitory computer-readable media comprising instructions thereon that, in response to execution by a computing system, cause the computing system to:
- determine, for an operation involving a mobile shelving unit having a plurality of shelves at different heights, a height level for the operation;
- determine one or more effective operational height zones for one or more operators associated with one or more stations of different heights, the one or more operators being assignable to perform the operation involving the mobile shelving unit; and
- assign an operator of the one or more operators to perform the operation involving the mobile shelving unit based at least on the determined height level for the operation involving the mobile shelving unit and the determined one or more effective operational height zones for the one or more operators.

17. The non-transitory computer-readable media of claim 16, wherein determine one or more effective operational height zones comprises determine one or more physical characteristics or physical capabilities of the one or more operators.

18. The non-transitory computer-readable media of claim 16, wherein determine one or more effective operational height zones comprises determine one or more station heights for the one or more stations at which the one or more operators are standing or sitting.

19. The non-transitory computer-readable media of claim 18, wherein the instructions further cause the computing system to associate the one or more operators to the one or more stations based on at least one of one or more physical characteristics or physical capabilities of the one or more operators, or the one or more station heights.

20. The non-transitory computer-readable media of claim 19, wherein associate the one or more operators to the one or more stations comprises associate the one or more operators such that the one or more effective operational height zones for the one or more operators at the one or more stations cover multiple height levels for a plurality of operations involving a plurality of mobile shelving units.

* * * * *